United States Patent [19]

Oakley

[11] Patent Number: 5,160,821
[45] Date of Patent: Nov. 3, 1992

[54] MOUNTING APPARATUS FOR A CUTTING TORCH

[75] Inventor: Thomas F. Oakley, Florence, S.C.

[73] Assignee: ESAB Welding Products, Inc., Florence, S.C.

[21] Appl. No.: 852,648

[22] Filed: Mar. 17, 1992

[51] Int. Cl.⁵ .............................. B23K 9/00; B23K 9/12
[52] U.S. Cl. .......................... 219/121.56; 219/121.54; 219/121.39; 219/124.34; 219/124.4; 318/578
[58] Field of Search ............ 219/124.1, 124.4, 124.39, 219/121.48, 121.54, 121.55, 121.56, 75; 313/231.21, 231.31; 318/575, 578

[56] References Cited

U.S. PATENT DOCUMENTS

| | | |
|---|---|---|
| 1,904,112 | 4/1933 | Achard ........................ 219/124.34 |
| 4,166,941 | 9/1979 | Cecil ............................ 219/121.34 |
| 4,284,871 | 8/1981 | Mawson et al. . | |
| 4,415,795 | 11/1983 | Ross et al. .................. 219/124.02 |
| 4,439,249 | 3/1984 | Singh et al. . | |
| 4,439,664 | 3/1984 | Toohey . | |
| 4,533,078 | 8/1985 | Klein et al. . | |
| 4,547,653 | 10/1985 | Franco-Ferreira et al. ... 219/124.34 |

Primary Examiner—Mark H. Paschall
Attorney, Agent, or Firm—Bell, Seltzer, Park & Gibson

[57] ABSTRACT

An apparatus for mounting a cutting torch to a shape cutting machine is disclosed, and which incorporates a control system for signaling the machine in the event the torch contacts an obstruction during either vertical or lateral movement of the torch by the machine. The control system includes a pair of plates mounted to the torch so that the plates are displaced relative to each other when the torch contacts an obstruction, and a number of gas release valves are mounted to the plates and which are connected to a gas line so that a signal is generated upon a relative displacement of the plates. The signal is directed to the control logic of the shape cutting machine so that it may take corrective action.

14 Claims, 3 Drawing Sheets

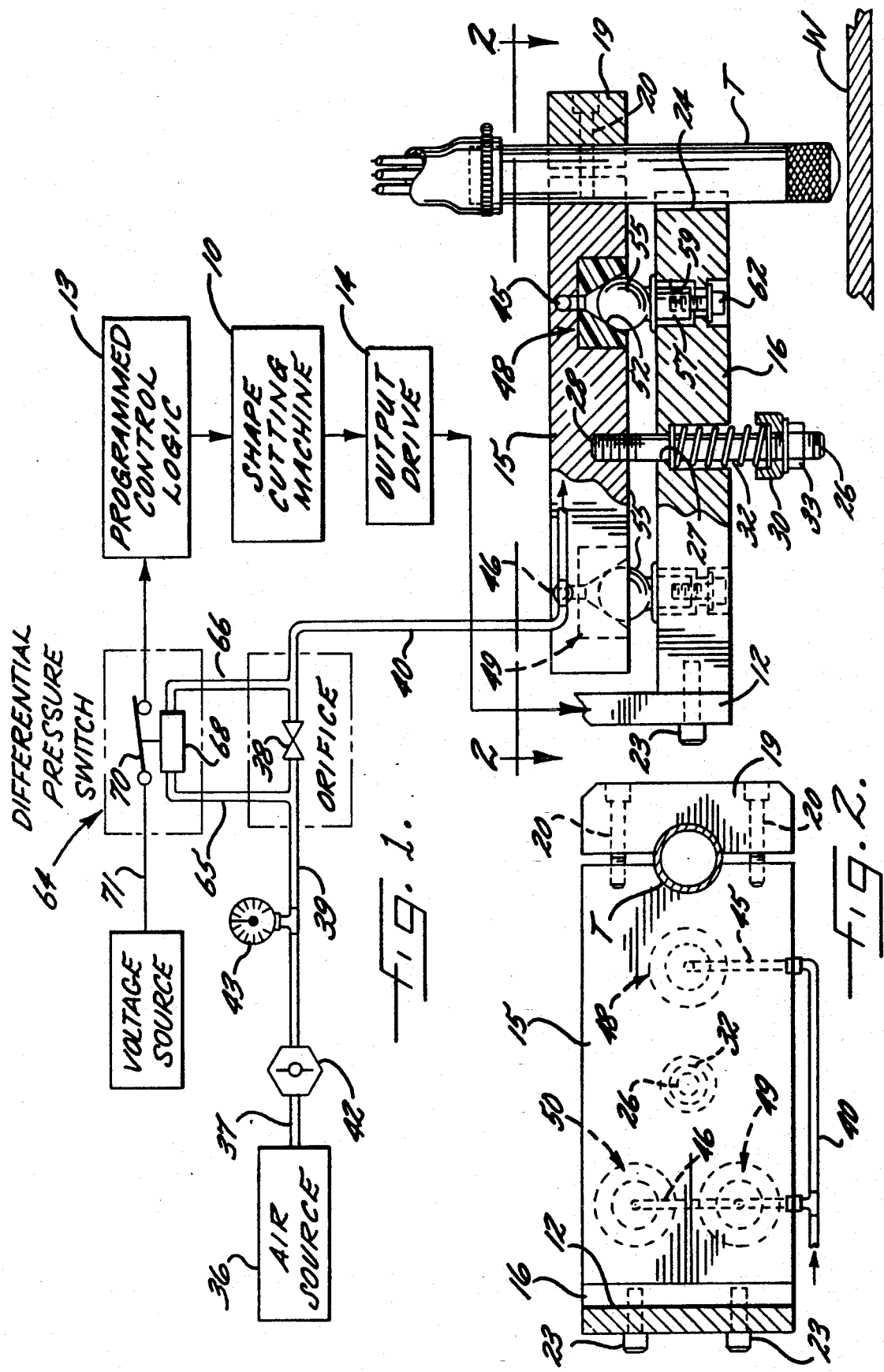

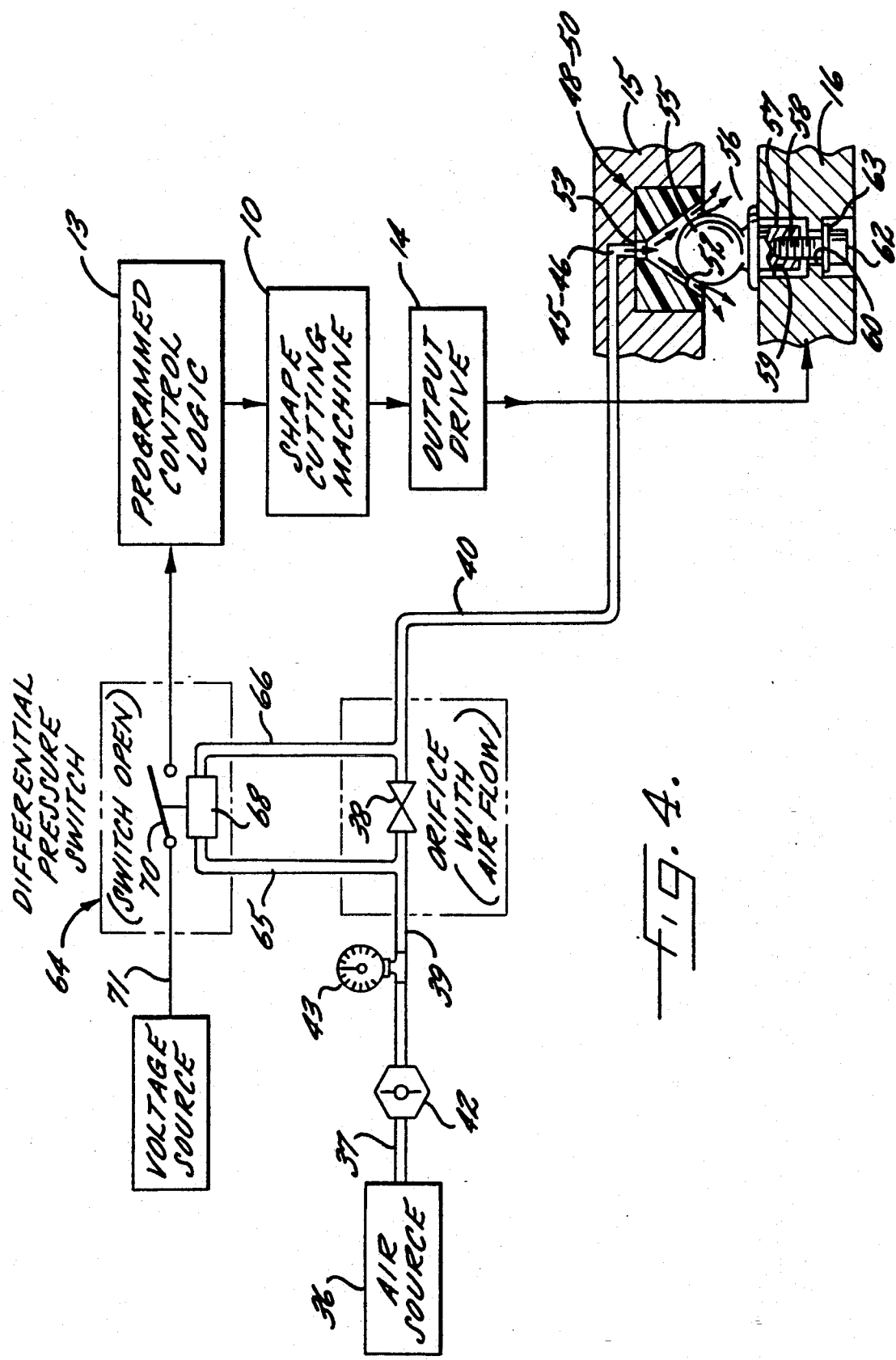

MOUNTING APPARATUS FOR A CUTTING TORCH

BACKGROUND OF THE INVENTION

The present invention relates to an apparatus for mounting a cutting torch, such as a gas or plasma arc torch, to a shape cutting machine, and with the mounting apparatus being characterized by the ability to detect contact between the torch and an obstruction during movement of the torch by the shape cutting machine.

U.S. Pat. No. 4,415,795 to Ross et al discloses a plasma arc cutting apparatus which is designed for cutting metal plates into a desired configuration. More particularly, the patent describes a process wherein the metal plate to be cut is submerged in a water bath, and the torch is supported in a vertical orientation by a shape cutting machine, such that the lower portion of the torch is also submerged in the water bath. In operation, the shape cutting machine first adjusts the torch to the appropriate vertical working height above the metal plate, and the torch is then ignited. Next, the machine manipulates the torch horizontally to effect cutting of the plate into the desired outline. The fact that the metal plate and the output end of the plasma arc torch are submerged in a water bath, significantly reduces the noise level of the operation, and it also reduces any ultraviolet radiation which is emitted by the plasma arc.

The above referenced patent to Ross et al also discloses a mounting structure for the torch which is adapted to detect vertical contact between the torch and the workpiece, and also lateral or sideward contact with the torch, such as contact between the torch and a side wall of the water tank or other obstruction. For this purpose, a number of microswitches are provided adjacent the torch which send a signal to the shape cutting machine when such contact is detected and so that the machine will be instructed to stop movement of the torch or take other corrective action.

While the above prior system for detecting contact of the torch with obstructions is satisfactory in many respects, the presence of the electrical microswitches in the environment of the process can result in their deterioration and thus a malfunction of the process. In addition, the prior mounting structure does not always accurately return the torch to its original aligned position, particularly after the unit had been subjected to wear and tear resulting from long usage.

It is accordingly an object of the present invention to provide an apparatus for mounting a cutting torch to a shape cutting machine and which is adapted to effectively and reliably detect contact between the torch and an obstruction during movement of the torch by the shape cutting machine.

It is a more particular object of the present invention to provide a mounting apparatus for a cutting torch which is able to detect contact between the torch and an obstruction, and then signal the shape cutting apparatus to take corrective action, and without the use of electrical switches in the environment of the cutting process.

It is another object of the present invention to provide a mounting apparatus for a cutting torch which is adapted to be mechanically upset when an obstruction is encountered, and which is thereafter able to reliably return the torch to its original aligned position.

SUMMARY OF THE INVENTION

The above and other objects and advantages of the present invention are achieved in the embodiment illustrated herein by the provision of a mounting apparatus for a cutting torch which comprises a torch supporting plate and a movement sensing plate. The torch supporting plate is rigidly connected to the torch so that the plate lies in a plane which extends laterally with respect to the longitudinal direction of the torch. The movement sensing plate is resiliently connected to the supporting plate so that the plates lie in an operative position wherein the plates are substantially parallel to and laterally aligned with respect to each other, and so that the plates are able to move with respect to each other from the operative position to a displaced position. One of the plates is connected to the shape cutting machine so that such plate and thus the torch may be moved vertically or laterally along a predetermined path.

The present invention also includes control means responsive to a relative movement of the plates from the operative position to a displaced position caused by the torch contacting an obstruction, and for then generating a signal which may be directed to the shape cutting machine. The control means comprises a pressurized gas source, a gas line connected to the source, valve means operatively connected to the gas line for closing the gas line when the plates are in the operative position and for at least partially opening the gas line upon the plates moving to a displaced position. A switch is also provided which is responsive to the gas line being opened by the valve means for generating a signal to the control logic of the shape cutting machine.

In the preferred embodiment, the valve means comprises at least one pressure release valve, with each valve comprising a concave seat mounted in one of said plates, an opening in the bottom of the seat which communicates with the gas line, and a ball supported between the seat and the other plate so as to close the opening when the plates are in the operative position and to open the opening when the plates are in a laterally displaced position. Preferably there are three such valves which are disposed in a triangular arrangement, so as to provide assurance of an opening of at least one valve upon a contact with the torch from any direction.

The means resiliently connecting the sensing plate to the supporting plate preferably comprises at least one threaded member extending through an opening in one of said plates and threadedly engaging the other of said plates. A nut is threadedly mounted on the free end of the threaded member, and a coil spring coaxially encircles the threaded member between the nut and the adjacent plate. Thus rotation of the nut permits the contact sensitivity of the control system to be adjusted.

BRIEF DESCRIPTION OF THE DRAWINGS

Some of the objects and advantages of the present invention having been stated, others will appear as the description proceeds, when taken in conjunction with the accompanying drawings in which:

FIG. 1 is a schematic side elevation view of a shape cutting machine and a mounting apparatus for a cutting torch which embodies the features of the present invention;

FIG. 2 is a top plan view of the mounting apparatus taken substantially along the line 2—2 of FIG. 1;

FIG. 4 is a schematic illustration of a pressure release valve in the open position.

DETAILED DESCRIPTION OF THE PREFERRED EMBODIMENT

Figure 3:
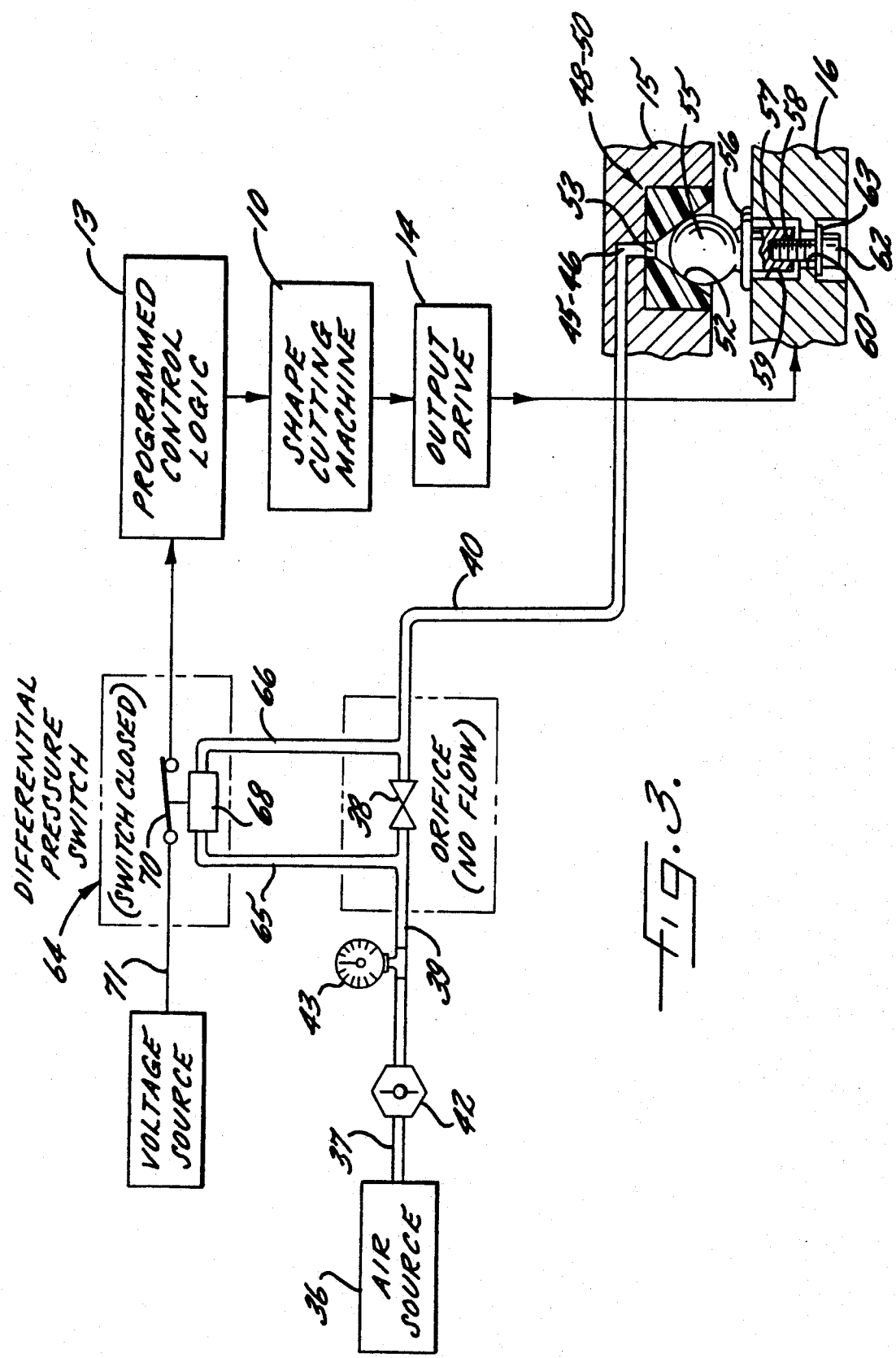
FIG. 3 is a schematic illustration of a pressure release valve of the present invention in the closed position.

Referring more particularly to the drawings, the numeral 10 schematically illustrates a conventional shape cutting machine. For a further description of the machine 10, reference is made to U.S. Pat. No. 4,415,795, the disclosure of which is expressly incorporated herein by reference. As is conventional, the shape cutting machine 10 includes a support bracket 12 to which a cutting torch, such as a gas or plasma arc torch is mounted. The machine 10 also includes a programmed control logic 13, and an output drive 14 for moving the support bracket 12 vertically or horizontally along a predetermined path of travel.

In accordance with the present invention, the torch T is mounted to the support bracket by a mounting structure which includes a torch supporting plate 15, and a movement sensing plate 16. The torch supporting plate 15 is fixedly connected to the torch T at an arcuate channel in one end 18 of the plate 15, and a mating bracket 19 which is configured to enclose the opposite side of the torch and which is connected to the plate 15 by bolts 20 as best seen in FIG. 2. The movement sensing plate 16 has one end 22 which is connected to the support bracket 12 of the shape cutting machine 10 by bolts 23, and an opposite end 24 which is adjacent but spaced from the torch. In the illustrated embodiment, the sensing plate 16 is below the supporting plate 15.

The sensing plate 16 is resiliently connected to the supporting plate 15 so that the plates lie substantially parallel to and adjacent to each other, and so that the plates are able to move laterally a limited distance with respect to each other. This resilient connection is effected by means of a threaded member 26 which extends through an opening 27 in the sensing plate 16 and is threadedly engaged with the supporting plate 15 at 28. A U-shaped cap 30 is slidably mounted on the end of the threaded member 26 which is opposite the supporting plate 15, and a coil spring 32 coaxially encircles the threaded member 26 between the sensing plate 16 and the cap 30. A nut 33 is threadedly mounted below the cap 30, so that rotation of the nut 33 axially moves the cap and thus adjusts the compression of the spring 32.

The torch mounting apparatus further comprises control means which is responsive to a movement of the plates 15,16 from the operative position as shown in FIGS. 1-3, to a displaced position as illustrated schematically in FIG. 4. Such displacement is typically caused by the torch T coming into contact with the workpiece W during the initial height adjustment of the torch, or with the sidewall of the water tank, or other obstruction as the torch is moved horizontally during the cutting operation. The control means then acts to signal the control logic 13 of the shape cutting machine 10 to take Corrective action, such as reversing the direction of movement of the torch or lifting the torch.

As illustrated schematically in the drawings, the control means comprises a source 36 of pressurized gas such as air, and a gas line 37 connected to the source which leads to the supporting plate 15. The line has a restrictive orifice 38 positioned therein, so as to define a first line segment 39 between the source 36 and the orifice 38, and a second line segment 40 between the orifice 38 and the supporting plate 15. In addition, the first line segment 39 mounts a conventional regulator 42, and a pressure gauge 43. The second line segment 40 communicates with each of two parallel passageways 45,46 formed in the supporting plate 15.

The control means further comprises three pressure release valves 48,49,50 which are disposed in a triangular arrangement as seen in FIG. 2, with each of the valves comprising a concave seat 52 mounted in the supporting plate 15, and with each concave seat defining an included angle of about 60° and having an opening 53 in the base thereof which communicates with one of the two passageways 45,46, and thus the second line segment 40. The concave seats 52 face downwardly toward the sensing plate 16, and are preferably fabricated from a suitable plastic material, such as nylon.

The sensing plate 16 mounts three ball assemblies which are aligned with respective ones of the seats 52. Each ball assembly comprises a metallic ball 55 which includes a mounting shoulder 56 and a depending stem 57, and the stem includes a tapped hole 58. The ball is mounted in an oversize opening 59 which extends through the sensing plate 16, with the lower end of the opening 59 being counterbored to form a shoulder 60. A socket head bolt 62 and a Washer 63 are mounted so that the bolt 62 engages the tapped hole 58 in the stem 57 so as to hold the ball 55 in a fixed position with respect to the sensing plate 16. The fact that the opening 59 in the plate is of a diameter larger than that of the stem 57 is advantageous, in that the ball 55 can be loosely assembled and adjusted laterally by engagement with the seat 52 to assure proper alignment when in the operative position, and before the bolt 62 is tightened. Thus the ball 55 may be accurately located and then fixedly supported between its seat 52 and the sensing plate 16 so that the ball 55 acts to close the opening 53 when the plates are in the operative position as seen in FIGS. 1-3.

In the illustrated and preferred embodiment, the triangular arrangement of the three valves 48,49,50 is oriented such that the valve 48 is positioned immediately adjacent the torch T, and the valves 49,50 are positioned laterally beyond the first valve 48 and equally spaced from the torch T. This arrangement has been found to provide a sensitive response, i.e., a release of pressure in the second line segment 40, upon contact of the torch from any direction. In this regard, it will be understood that the pressure of the coil spring 32 acts to press the plates 15,16 toward each other and such that the three balls 55 hold the plates separated and are under compression. The coil spring 32 thus also acts to press each of the balls into its seat 52, and since the spring pressure is adjustable by rotation of the nut 33, the sensitivity of the valves can be adjusted.

The control means further includes a differential pressure switch assembly 64 which is responsive to a difference in the pressures in the first and second line segments 39,40 resulting from a release of pressure caused by any one of the pressure release valves 48-50 being opened. More particularly, and as best seen in FIG. 1, the differential pressure switch assembly 64 includes a pair of lines 65,66 connected to the line 37 on respective opposite sides of the orifice 38, with the pair of lines 65,66 leading to a actuator 68, which serves to control the position of an electrical switch 70 in an electrical line 71. As seen in FIG. 3, the switch 70 is closed when the pressure release valves 48-50 are closed and the machine is in normal operation. As seen in FIG. 4, the switch 70 is open when the plates 15,16 are displaced relative to each other and one or more of the pressure release valves 48-50 are open.

During the initial set up of a plasma arc torch, the shape cutting machine 10 conventionally first acts to position the lower end of the torch T a predetermined working height above the workpiece W. More particularly, and as further described in U.S. Pat. No. 4,415,795, the workpiece W is submerged in a water bath, and the torch T is lowered into the bath until its lower end contacts the torch. When this happens, the contact is detected and the drive motor reverses its direction of rotation for a predetermined time, after which the drive motor is stopped. By design, the predetermined time is sufficient to lift the torch to its working height.

To position the torch T at the proper working height in accordance with the present invention, the plates 15,16 are initially positioned in the operative position, such that all of the valves 48-50 are closed, and the pressure in the second line segment 40 balances the pressure in the first line segment 39. The switch 70 will accordingly be closed as seen in FIGS. 1 and 3. As the torch T is lowered by the output drive 14, the torch T eventually comes into contact with the workpiece, causing the two plates 15,16 to pivot about the two balls 55 of the two laterally remote valves 49,50, thereby separating the ball 55 from the seat 52 of the valve 48 closest to the torch. The pressure of the gas in the second line segment is thus reduced, which is detected by the actuator 68, and which in turn opens the switch 70 and thereby signals the shape cutting machine 10 to stop and then reverse its drive direction.

During normal cutting operation of the shape cutting machine 10, the torch T is traversed horizontally along a predetermined path of travel, and plates 15,16 are again in the operative position so that the balls 55 of the pressure release valves 48-50 block gas flow outwardly from the second line segment 40. The pressure across the orifice 38 is balanced, and the switch 70 is closed as seen in FIG. 3. When the torch T contacts an obstruction, the plates 15,16 are shifted laterally with respect to each other, and one or more of the balls 55 are shifted in their seats 52 so that the gas is free to escape as seen in FIG. 4. At this time, the pressure across the orifice 38 becomes unbalanced, and this unbalance is detected by the actuator 68 so as to open the electrical switch 70 as seen in FIG. 4. The opening of the line 71 signals the control logic 13 to stop operation or take corrective action, such as reversing the direction of movement or lifting the torch.

After the plates 15,16 have been displaced from the operative position, a release of the contact force against the torch results in the plates being automatically re-aligned into the operative position, with the balls 55 again closing the openings of their respective seats. As will be apparent, this automatic re-alignment results from the fact that the coil spring 32 acts to press the balls 55 into their seats 52. Further, the fact that the seats 52 open downwardly is advantageous in that the gas which escapes when the plates are displaced from the operative position serves to automatically clean the openings 53 and the seats 52 of debris which could cause the valves to leak.

In the drawings and specification, there has been set forth a preferred embodiment of the invention, and although specific terms are employed, they are used in a generic and descriptive sense only and not for purposes of limitation.

That which is claimed is:

1. An apparatus for mounting a cutting torch to a shape cutting machine, with the apparatus being characterized by the ability to detect contact between the torch and an obstruction during movement of the torch by the shape cutting machine in either the vertical or lateral directions, and comprising a torch supporting plate, means for rigidly connecting said supporting plate to said torch and so that said plate lies in a plane which extends laterally from the torch, a movement sensing plate, means resiliently connecting said sensing plate to said supporting plate so that said plates lie in an operative position wherein said plates are substantially parallel to and laterally aligned with respect to each other, and so that said plates are able to move with respect to each other from said operative position to a displaced position, means for connecting one of said plates to the shape cutting machine so that said one plate and thus said torch may be moved vertically or laterally along a predetermined path, control means responsive to a relative movement of said plates from said operative position to a displaced position caused by the torch contacting an obstruction and for then generating a signal which is adapted to be sent to the shape cutting machine and so that the machine may take corrective action, said control means comprising (a) a pressurized gas source, (b) a gas line connected to said source, (c) valve means operatively connected to said gas line for closing said gas line when said plates are in said operative position and for at least partially opening said gas line upon said plates relatively moving to a displaced position, and (d) switch means responsive to said gas line being opened by said valve means for generating a signal.

2. The apparatus as defined in claim 1 wherein said valve means comprises at least one valve, with said one valve comprising a concave seat mounted in one of said plates, an opening in the bottom of said seat which communicates with said gas line, and a ball supported between said seat and the other of said plates so as to close said opening when said plates are in said operative position and to open said opening when said plates are in a displaced position.

3. The apparatus as defined in claim 1 wherein said valve means comprises at least three valves which are disposed in a triangular arrangement, with each of said valves comprising a concave seat mounted in one of said plates, an opening in the bottom of said seat which communicates with said gas line, and a ball supported between said seat and the other of said plates so as to close said opening when said plates are in said operative position and to open said opening when said plates are in a displaced position.

4. The apparatus as defined in claim 3 wherein one of said valves is positioned immediately adjacent said torch, and two of said valves are positioned laterally beyond said one valve and equally spaced from said torch.

5. The apparatus as defined in claim 4 wherein said means resiliently connecting said sensing plate to said supporting plate comprises means for resiliently pressing said plates toward each other and such that the balls of said valves hold the plates separated and are under compression, and including means for adjusting the compression force.

6. The apparatus as defined in claim 5 wherein said means for resiliently pressing said plates toward each other comprises at least one threaded member extending through an opening in one of said plates and threadedly engaging the other of said plates, a nut threadedly mounted on the end of said one threaded member which is opposite said other plate, and a coil spring coaxially encircling said threaded member and positioned between said one plate and said nut, and such that rotation of said nut on said threaded member serves to adjust the compression of said coil spring.

7. The apparatus as defined in claim 3 wherein said gas line has a restrictive orifice therein so as to define a first line segment between said source and said orifice, and a second line segment between said orifice and said valves, and wherein said switch means is responsive to a difference in the pressures in said first and second line segments.

8. An apparatus for cutting a workpiece along a predetermined path and comprising
   an elongate cutting torch defining a longitudinal direction along the length thereof,
   a torch supporting plate,
   means rigidly connecting said supporting plate to said torch and so that said plate lies in a plane which extends laterally with respect to said longitudinal direction,
   a movement sensing plate,
   means resiliently connecting said sensing plate to said supporting plate so that said plates lie in an operative position wherein said plates are substantially parallel to and laterally aligned with respect to each other, and so that said plates are able to move with respect to each other from said operative position to a displaced position,
   a shape cutting machine including a support bracket, and programmed drive means for moving said support bracket vertically and horizontally along a predetermined path of travel in each direction,
   means connecting one of said plates to said support bracket of said shape cutting machine so that said plates are disposed in generally horizontal planes and the longitudinal direction of said torch is oriented substantially vertically,
   control means responsive to a relative movement of said plates from said operative position to a displaced position caused by the torch contacting an obstruction and for then signalling said programmed drive means of said shape cutting machine, said control means comprising
   (a) a pressurized source,
   (b) a gas line connected to said source,
   (c) valve means operatively connected to said gas line for closing said gas line when said plates are in said operative position and for at least partially opening said gas line upon said plates relatively moving to a displaced position, and
   (d) switch means responsive to said gas line being opened by said valve means for generating a signal.

9. The apparatus as defined in claim 8 wherein said valve means comprises at least three valves which are disposed in a triangular arrangement, with each of said valves comprising a concave seat mounted in one of said plates, an opening in the bottom of said seat which communicates with said gas line, and a ball supported between said seat and the other of said plates so as to close said opening when said plates are in said operative position and to open said opening when said plates are in a displaced position.

10. The apparatus as defined in claim 9 wherein one of said valves is positioned immediately adjacent said torch, and two of said valves are positioned laterally beyond said one valve and equally spaced from said torch.

11. The apparatus as define in claim 9 wherein said means resiliently connecting said sensing plate to said supporting plate comprises means for resiliently pressing said plates toward each other and such that the balls of said valves hold the plates separated and are under compression, and including means for adjusting the compression force.

12. The apparatus as defined in claim 11 wherein said gas line has a restrictive orifice therein so as to define a first line segment between said source and said orifice, and a second line segment between said orifice and said valves, and wherein said switch means is responsive to a difference in the pressures in said first and second line segments.

13. The apparatus as defined in claim 8 wherein said concave seats of said valve means are mounted in the upper one of said plates and face downwardly, so as to be cleaned by the gas passing outwardly therefrom.

14. The apparatus as defined in claim 8 wherein said sensing plate includes a first end which is adjacent but spaced from said torch, and an opposite end, and wherein said support bracket of said shape cutting machine is connected to said opposite end of said sensing plate.

* * * * *